C. MADUELL.

Improvement in Projectiles for Small Arms.

No. 4,814. Reissued March 19, 1872.

Witnesses:

John Becker.

Francis McArdle

Inventor:

C. Maduell

Per

Attorneys.

4,814

UNITED STATES PATENT OFFICE.

CARLOS MADUELL, OF NEW ORLEANS, LOUISANA.

IMPROVEMENT IN PROJECTILES FOR FIRE-ARMS.

Specification forming part of Letters Patent No. 122,620, dated January 9, 1872; reissue No. 4,814, dated March 19, 1872.

Specification describing a certain Improvement in Missiles for Fire-Arms, invented by CARLOS MADUELL, of New Orleans, in the parish of Orleans and State of Louisiana.

My invention relates to an improvement in the class of missiles or projectiles for fire-arms in which the balls or bullets are formed in transverse or longitudinal sections. Hitherto these have been so constructed that when fitted together they were free to move one upon the other, and hence the slightest cause in the form of an obstacle to flight of the ball may induce the sections to become separated, and thus frustrate the purpose of the missile. To remedy this defect, and provide a sectional ball capable of being rapidly, conveniently, and even carelessly handled without liability of the parts composing it becoming misplaced in the slightest degree, I form the section with lateral angular projections and recesses, whereby they are adapted to fit together, as hereinafter more fully described.

Figure 1:
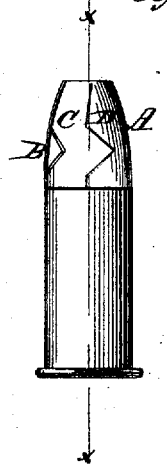
Figure 2:
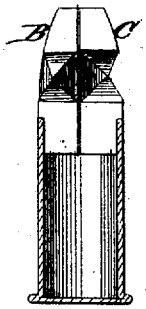
Figure 3:
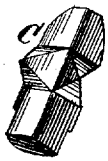
Figure 4:
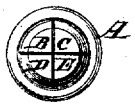

In the accompanying drawing, Figure 1 represents a side view of a sectional conical missile attached to a metallic cartridge-case, the same being constructed according to my invention. Fig. 2 is a longitudinal section of Fig. 1, taken on the line *x x*. Fig. 3 is a perspective view of one of the sections. Fig. 4 represents a top view.

Similar letters of reference indicate corresponding parts.

A is the sectional missile or projectile, which is composed of four parts, marked, respectively, B, C, D, and E, each part being provided with an angular projection and depression, so that they will fit together and make a complete whole, as seen in Fig. 1, when in the barrel of the fire-arm. In this condition each section receives, when the missile is projected from the fire-arm, the full force and momentum of a solid projectile.

Having described my invention, I claim—

The missile herein described, consisting of the longitudinal sections B C D E, each provided with a lateral angular projection and recess, and all fitted together, as specified.

CARLOS MADUELL.

Witnesses:

T. AVENDAÑO,

ANTONIO LARRINAGA.